US007790780B2

(12) United States Patent
Lehmann et al.

(10) Patent No.: US 7,790,780 B2
(45) Date of Patent: *Sep. 7, 2010

(54) RADICALLY COUPLED PTFE POLYMER POWDERS, AND METHOD FOR THE PRODUCTION THEREOF

(75) Inventors: Dieter Lehmann, Coswig (DE); Bernd Kluepfel, Dresden (DE)

(73) Assignee: Leibniz-Institut fuer Polymerforschung Dresden E.V., Dresden (DE)

( * ) Notice: Subject to any disclaimer, the term of this patent is extended or adjusted under 35 U.S.C. 154(b) by 681 days.

This patent is subject to a terminal disclaimer.

(21) Appl. No.: 10/577,305

(22) PCT Filed: Oct. 22, 2004

(86) PCT No.: PCT/EP2004/052620

§ 371 (c)(1),
(2), (4) Date: Jan. 25, 2007

(87) PCT Pub. No.: WO2005/042596

PCT Pub. Date: May 12, 2005

(65) Prior Publication Data

US 2007/0282031 A1     Dec. 6, 2007

(30) Foreign Application Priority Data

Oct. 30, 2003 (DE) .............................. 103 51 813

(51) Int. Cl.
C08J 7/04 (2006.01)
C08J 7/16 (2006.01)
C08F 259/08 (2006.01)

(52) U.S. Cl. ............... 522/156; 525/286; 525/296; 525/304; 525/308; 525/273; 522/125; 522/116; 522/120

(58) Field of Classification Search .......... 522/113–125, 522/156, 149; 525/273, 286, 296, 304, 308
See application file for complete search history.

(56) References Cited

U.S. PATENT DOCUMENTS

| | | | |
|---|---|---|---|
| 3,298,942 A | | 1/1967 | Magat et al. |
| 3,666,693 A | * | 5/1972 | Chapiro et al. ............... 428/422 |
| 4,129,617 A | | 12/1978 | Machi et al. |
| 4,179,401 A | | 12/1979 | Garnett et al. |
| 4,220,511 A | * | 9/1980 | Derbyshire ................... 522/4 |
| 4,385,130 A | * | 5/1983 | Molinski et al. ............... 521/31 |
| 4,652,592 A | * | 3/1987 | Kawashima et al. ......... 522/117 |
| 5,075,342 A | * | 12/1991 | Ishigaki et al. ............... 521/27 |
| 5,087,936 A | | 2/1992 | Ogata et al. |
| 5,169,675 A | | 12/1992 | Bartoszek-Loza et al. |
| 5,260,093 A | * | 11/1993 | Kamel et al. ............... 427/2.25 |
| 5,444,103 A | * | 8/1995 | Tabata et al. .................... 522/5 |
| 5,576,106 A | | 11/1996 | Kerbow et al. |
| 5,756,199 A | | 5/1998 | Kerbow et al. |
| 6,040,370 A | * | 3/2000 | Wozny et al. ................ 524/394 |
| 6,225,368 B1 | | 5/2001 | D'Agostino et al. |
| 6,387,964 B1 | | 5/2002 | D'Agostino et al. |
| 6,632,470 B2 | * | 10/2003 | Morra et al. ................ 427/2.24 |
| 6,770,378 B1 | | 8/2004 | Lehmann |
| 6,824,872 B2 | * | 11/2004 | Coates et al. ............... 428/403 |
| 2003/0199639 A1 | | 10/2003 | Coates et al. |
| 2004/0033358 A1 | | 2/2004 | Coates et al. |
| 2007/0244212 A1 | | 10/2007 | Lehmann |
| 2009/0105436 A1 | | 4/2009 | Lehmann et al. |

FOREIGN PATENT DOCUMENTS

| | | |
|---|---|---|
| DE | 146716 | 10/1979 |
| DE | 2005-312 | 5/1983 |
| DE | 19823609 | 12/1999 |
| FR | 2318896 | 2/1977 |
| FR | 2494702 | 5/1982 |
| GB | 1495297 | 12/1977 |
| GB | 1516648 | 7/1978 |
| JP | 62-036431 A | 2/1987 |
| JP | 63-007455 | 1/1988 |
| JP | 02-072771 A | 3/1990 |
| JP | 2002-338931 A | 11/2002 |

(Continued)

OTHER PUBLICATIONS

A. Heger et al., Technologie der Strahlenchemie an Polymeren, Akademie-Verlag Berlin 1990, 463-488 and 496-501.
Ferse et al., Plaste u. Kautschuk, 29 (1982), 45-465.
K. Schierholz et al., J. Polym. Sci. Part B, Polymer Physics, vol. 37, 2404-2411 (1999).
English Language Abstract of FR 2318896.
English Language Abstract of JP 2004-107461.
Dargaville et al., "High Energy Radiation Grafting Of Fluoropolymers", Prog. Poly. Sci. 28 (2003) 1355-1376.
English Language Abstract of JP 63-007455.
Patent Abstracts of Japan, vol. 011, No. 222 (C-435), Jul. 18, 1987.
Patent Abstracts of Japan, vol. 2003, No. 03, May 5, 2003.

(Continued)

Primary Examiner—Susan W Berman
(74) Attorney, Agent, or Firm—Greenblum & Bernstein, P.L.C.

(57) ABSTRACT

Radically coupled PTFE polymer powders useful, for example, as tribomaterials, and a method for production thereof. Radically coupled PTFE polymer powders are provided which, when incorporated into a matrix as PTFE polymer compound, exhibit improved wear resistances, and furthermore there is provided a simple and efficient method for the production thereof. Radically coupled PTFE polymer powders are provided comprising radiation-chemically and/or plasma-chemically modified PTFE powders, onto the particle surface of which homopolymers, copolymers or terpolymers are radically coupled via a reaction in dispersion or in substance. A method is provided in which PTFE powders with reactive perfluoroalkyl-(peroxy) radical centers after a radiation-chemical and/or plasma-chemical modification are reacted in dispersion or in substance with the addition of polymerizable, olefinically unsaturated monomers, whereby during the reaction a polymer-forming reaction is obtained.

15 Claims, No Drawings

FOREIGN PATENT DOCUMENTS

| | | |
|---|---|---|
| JP | 2004-107461 | 4/2004 |
| WO | 96/03448 | 2/1996 |
| WO | 99/61527 | 12/1999 |
| WO | 2004/081546 A1 | 9/2004 |
| WO | 2005/042597 | 5/2005 |
| WO | 2005/042599 | 5/2005 |

OTHER PUBLICATIONS

Patent Abstracts of Japan, vol. 014, No. 252 (E-0934), May 20, 1990.

D.-W. Lee, "Ionisierende Strahlen Machen PTFE-Abefälle Wiederverwertbar", Kunststoffe, vol. 84, pp. 277-278, and 280 (1994), with an English language translation.

Drobny, Technology of Fluoropolymers, 2001, CRC Press LLC, pp. 8-9 and 60-63.

U.S. Appl. No. 10/577,619, filed Oct. 22, 2004, to Lehmann et al.

U.S. Appl. No. 10/577,300, filed Oct. 22, 2004, to Lehmann.

* cited by examiner

RADICALLY COUPLED PTFE POLYMER POWDERS, AND METHOD FOR THE PRODUCTION THEREOF

FIELD OF THE INVENTION

The invention relates to the field of chemistry and relates to radically coupled PTFE polymer powders that can be used, for example, as tribomaterials, and a method for the production thereof.

BACKGROUND INFORMATION

"In the search for polymer materials appropriate for building nuclear reactors, it was determined that PTFE, in contrast to its high chemical and thermal stability, is extraordinarily sensitive to radiation. Under inert conditions as well as in the present of oxygen, it even decomposes at low absorbed doses, becomes brittle even at 0.2 to 0.3 kGy and crumbly at <100 kGy....

Beginning at approximately 360° C., the purely radiochemical decomposition is noticeably overlaid by a thermal decomposition....

Due to the stochastic progression of the radiochemical decomposition, reaction products form with a wide spectrum of chain lengths....

If PTFE is irradiated in the presence of oxygen, peroxy and alkoxy radicals are formed from the perfluoroalkyl radicals that initially formed....

In the course of the intermediate stage of the formation of the alkoxy radical, the perfluoroalkyl radical end group is decomposed in stages by shortening the chains and formation of carbonyldifluoride....

In contrast, perfluoroalkanic acid fluorides and perfluoroalkyl radical end groups form from the alkoxy radical side groups....

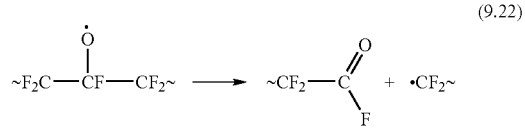

(9.22)

... Unsintered and unpressed PTFE emulsion and suspension polymers are of a fibrous-felted character. A transfer, for example, of the anti-adhesive and sliding characteristics of PTFE to other media by integration into aqueous or organic dispersions, polymers, dyes, lacquers, resins, or lubricants is not possible because this PTFE cannot be homogenized, but rather tends to form clumps, agglomerates, floods, or settles.

By means of the effect of high-energy radiation with an absorbed dose of approximately 100 kGy, a pourable fine powder is obtained from the fibrous-felted polymers as a result of the partial decomposition of the polymer chains. This powder still contains loose agglomerates that can be easily separated into primary particles with a particle diameter of <5 μm. In the case of irradiation in the presence of reactants, functional groups are formed into the polymer. If the irradiation occurs in air, then according to Eq. (9.22) (and subsequent hydrolysis of the —COF groups by means of moisture in the air), carboxyl groups result. If, before irradiation, $(NH_4)_2SO_3$ is mixed in, then groups containing S are to be attained. These functional groups reduce the hydrophobia and organophobia of the PTFE so substantially that the resulting fine powder can be easily homogenized with other media.

The positive characteristics of PTFE, such as its excellent gliding, separating, and dry lubrication characteristics as well as its high chemical and thermal stability, are maintained. Carboxyl and sulfonic acid groups to which perfluorized chains are connected also have a high degree of chemical inertness....

Because of the insolubility of the PTFE and its decomposition products (with the exception of the very low-molecular products), the conventional methods of determining molar mass cannot be used. The determination of molar mass must occur in an indirect manner." [A. Heger et al., Technologie der Strahlenchemie an Polymeren, Akademie-Verlag Berlin 1990].

The incompatibility with other materials often has a negative effect. By chemically activating PTFE using the known methods with (1) sodium amide in liquid ammonia and (2) alkali alkyl and alkali aromatic compounds in aprotic inert solvents, a modification can be achieved. By means of these modifications, boundary surface interactions can be achieved that are reactive or even only improved by adsorptive forces.

Recycling of the products of PTFE decomposition occurs in various fields of use also as an additive to plastics for the purpose of achieving gliding or anti-adhesive characteristics. The fine powder substances are more or less finely dispersed as filler components in a matrix [Ferse et al., Plaste u. Kautschuk, 29 (1982), 458; Ferse et al. DD-PS 146 716 (1979)]. In releasing the matrix components, the PTFE fine powder can be eliminated and/or is recovered.

Although, in the areas of use of PTFE fine powder, an improvement of the characteristics is achieved as compared to the commercial fluorocarbon-free additives, the incompatibility, the insolubility, the loose coupling, and also heterogeneous distribution is disadvantageous for many areas of use.

Furthermore, grafted plastics containing. fluorine are known (U.S. Pat. No. 5,576,106) comprising plastic particles containing fluorine, on the surface of which a non-homopolymerized ethylenically unsaturated compound is grafted. The non-homopolymerized ethylenically unsaturated compounds can thereby be acids, esters or anhydrides.

These grafted plastics containing fluorine are produced by exposing the plastic powder containing fluorine produced by means of a melting process to a source of ionizing radiation in the presence of the ethylenically unsaturated compound. The bonding of the ethylenically unsaturated compounds thereby occurs on the surface of the plastic particles containing fluorine.

SUMMARY OF THE INVENTION

The object of the invention is to disclose radically coupled PTFE polymer powders that exhibit improved wear resistances with comparable sliding properties as a PTFE polymer compound after incorporation into a matrix, and thus the durability of the components of this compound is increased, and furthermore a simple and efficient method for producing such radically coupled PTFE polymer powders.

The present invention also provides a radically coupled polytetrafluoroethylene polymer powder comprising at least one of radiation-chemically and plasma-chemically modified polytetrafluoroethylene powder including a surface, and homopolymers, copolymers or terpolymers radically coupled on the surface via a reaction in dispersion or in substance.

The polytetrafluoroethylene powder can be radiation-chemically modified. The polytetrafluoroethylene powder can be radiation-chemically modified with a radiation dose greater than 50 kGy.

The polytetrafluoroethylene powder can be radiation-chemically modified with a radiation dose greater than 100 kGy.

The polytetrafluoroethylene powder can be radiation-chemically modified in presence of reactants.

The polytetrafluoroethylene powder can be radiation-chemically modified under influence of oxygen.

Styrene, acrylonitrile, maleic anhydride, acrylic acid, (meth-) methyl acrylate, vinyl acetate, glycidyl methacrylate, (meth-) acrylamide compounds or mixtures thereof can be added as polymerizable, olefinically unsaturated monomers.

The present invention also provides a method comprising at least one of radiation- chemically and plasma-chemically modified polytetrafluoroethylene powder including a surface, and homopolymers, copolymers or terpolymers radically coupled on the surface via a reaction in dispersion or in substance, comprising reactively converting polytetrafluoroethylene powder that is at least one of radiation-chemical and plasma-chemical modified and has reactive perfluoroalkyl-(peroxy) radical centers, in dispersion or substance with addition of polymerizable, olefinically unsaturated monomers, so that a polymer-forming reaction to homopolymers, copolymers or terpolymers on the polytetrafluoroethylene powder is obtained.

The polytetrafluoroethylene powder with reactive perfluoroalkyl-(peroxy) radical centers after at least one of radiation-chemical and plasma-chemical modification can be subjected to a tempering at low temperatures yielding the reactive perfluoroalkyl-(peroxy) radical centers.

The polytetrafluoroethylene powder can comprise radiation-chemically modified polytetrafluoroethylene powder.

The polytetrafluoroethylene powder can be radiation-chemically modified with a radiation dose greater than 50 kGy.

The polytetrafluoroethylene powder can be radiation-chemically modified with a radiation dose greater than 100 kGy.

The polytetrafluoroethylene powder can be radiation-chemically modified in presence of reactants.

The polytetrafluoroethylene powder can be radiation-chemically modified under the influence of oxygen.

The polytetrafluoroethylene powder can be a micropowder.

The reaction can be performed in an autoclave or in a stirred tank or in an extruder/kneader.

Olefinically unsaturated monomers can comprise at least one of styrene, acrylonitrile, maleic anhydride, acrylic acid, (meth-)methyl acrylate, vinyl acetate, glycidyl methacrylate and (meth-)acrylamide compounds.

The olefinically unsaturated monomers can comprise a mixture of monomers.

The olefinically unsaturated monomers can comprise at least one of macromeres and oligomers.

The polytetrafluoroethylene polymer powder can include functional groups which in subsequent reactions can be reacted with other low-molecular, oligomeric and/or polymeric substances.

The powder can be incorporated in plastics/polymers.

The polytetrafluoroethylene polymer powder can be incorporated into at least one of elastomers, thermoplastics and thermosets.

DETAILED DESCRIPTION

The radically coupled PTFE polymer powders according to the invention comprise radiation-chemically or plasma-chemically modified PTFE powders, onto the particle surface of which homopolymers, copolymers or terpolymers are radically coupled via a reaction in dispersion or in substance.

Advantageously, the PTFE powder is radiation-chemically modified.

Likewise advantageously, the PTFE powder is radiation-chemically modified with a radiation dose greater than 50 kGy and preferably with a radiation dose greater than 100 kGy.

It is also advantageous if the PTFE powder is radiation-chemically modified in the presence of reactants, preferably under the influence of oxygen.

It is likewise advantageous if styrene, acrylonitrile, maleic anhydride, acrylic acid, (meth-)methyl acrylate, vinyl acetate, glycidyl methacrylate, (meth-)acrylamide compound(s) or mixtures thereof are used as polymerizable, olefinically unsaturated monomers.

With the method according to the invention for producing radically coupled PTFE polymer powders, PTFE powder with reactive perfluoroalkyl-(peroxy-)radical centers is reacted in dispersion or in substance after a radiation-chemical and/or plasma-chemical modification with the addition of polymerizable, olefinically unsaturated monomers. A polymer-forming reaction to homopolymers, copolymers or terpolymers on the PTFE is thereby realized during the reaction.

It is also advantageous if the PTFE powders with reactive perfluoroalkyl-(peroxy-)radical centers after a radiation-chemical and/or plasma-chemical modification are subjected to a tempering at low temperatures yielding the reactive perfluoroalkyl-(peroxy-)radical centers.

Advantageously, radiation-chemically modified PTFE powder is used.

Likewise advantageously, PTFE powder is radiation-chemically modified with a radiation dose greater than 50 kGy and preferably with a radiation does greater than 100 kGy.

It is also advantageous for the PTFE powder to be radiation-chemically modified in the presence of reactants, preferably under the influence of oxygen.

It is furthermore advantageous if the PTFE powder is used as micropowder.

It is also advantageous if the reaction is realized in an autoclave or in a stirred tank or in an extruder/kneader.

It is also advantageous if styrene, acrylonitrile, maleic anhydride, acrylic acid, (meth-)methyl acrylate, vinyl acetate, glycidyl methacrylate, (meth-)acrylamide compound(s) are added as polymerizable, olefinically unsaturated monomers.

It is likewise advantageous if a mixture of monomers is used.

It is also advantageous if macromeres and/or oligomers are used as polymerizable, olefinically unsaturated monomers.

It is furthermore advantageous if the PTFE polymer powders are provided with functional groups which in subsequent reactions are reacted with other low-molecular and/or oligomeric and/or polymeric substances such as advantageously via compounding in plastics/polymers or through incorporation in elastomers and/or thermoplastics and/or thermosets and/or mixtures thereof.

The radical coupling according to the invention of PTFE (micro) powders with monomers with the formation of grafted homopolymers, copolymers or terpolymers on the PTFE particle surface in dispersion or in substance leads to PTFE polymer powders that can be adapted in a targeted manner for the compatibilization and fixed incorporation in the matrix, which can be advantageously utilized for tribomaterials. Thus special graft branches can be polymerized onto the PTFE particle surface, which in a compounding with thermoplastics, elastomers and/or thermosets show a very good compatibility and interaction with this PTFE polymer powder modified according to the invention or also a chemical bond to functionalities of the graft branches. Special tribomaterials can thus be produced which, in addition to a comparable gliding friction, have an increased wear resistance compared to the pure base materials and the physical mixtures with PTFE.

According to the invention, dispersion means that the PTFE (micro) powder is present undissolved in a liquid and the monomer (mixture) forms the liquid or is present dissolved in the liquid. With a deficit of liquid, the dispersion can also be present as a pasty mass.

A radical coupling/reactive reaction in substance means that the PTFE (micro) powder is reacted to the PTFE polymer powder as a swirled or fluidized PTFE (micro) powder advantageously under inert gas in the presence of a monomer (mixture).

In the advantageously radiation-chemical modification of PTFE to PTFE (micro) powders, preferably persistent (long-lived) reactive perfluoroalkyl-(peroxy)radical centers are formed, which surprisingly are capable of coupling with polymerizable, olefinically unsaturated polymers in a reactive conversion. With a plasma treatment, superficially similar reactive perfluoroalkyl-(peroxy)radical centers can be produced and used for this coupling reaction; however, these reactive perfluoroalkyl-(peroxy)radical centers are not optimal in their distribution and density compared to the reactive perfluoroalkyl-(peroxy)radical centers produced radiation-chemically. Thus, after the PTFE (micro) powder modification with monomers in dispersion or in substance after separation and purification of these PTFE powders, a chemical coupling of homopolymers, copolymers or terpolymers could be proven by means of infrared spectroscopy, depending on the adjustment of the modification batch, i.e., the polymer chains were no longer detachable from the PTFE via extraction. Compared to unirradiated PTFE (micro-)powders without reactive perfluoroalkyl-(peroxy)radical centers or also in the presence of uncombined radical initiators, no grafted/surface-modified PTFE (micro) powders form. This PTFE (micro) powder could be separated quantitatively unchanged. The radical coupling according to the invention of monomer (mixture)(s) on the PTFE (micro) powder leads to a surface modification of the PTFE such that the polymer is present grafted to the PTFE. According to the grafted graft polymer structure, one skilled in the art can respectively deduce whether the reactive incorporation/compatibilization of these PTFE polymer powders with the matrix of a different polymer is realized via a compatibilization and/or in a subsequent chemical reaction/modification with polymers, which leads to an improvement of the material properties and an increase in the wear resistance compared to the unmodified base materials and the physical mixtures with unmodified PTFE. To improve the wear resistance it is further advantageous to utilize the radically coupled PTFE particles simultaneously as a storage medium for PFPE additives (PFPE=perfluoropolyether), which medium is incompatible with the matrix and helps to reduce the friction coefficient while at the same time increasing wear resistance.

Another advantage of the invention is that the graft branches on the PTFE particle have reactive centers that via a subsequent modification according to known synthesis steps leads to PTFE polymer products which could not be produced according to the prior art.

The radically coupled PTFE polymer powders are produced according to the invention in that, for example, a PTFE emulsion polymer (TF 2025 from Dyneon) is irradiated with 200 kGy and a PTFE suspension polymer (TF 1750 from Dyneon) is irradiated in air with 500 kGy. During the irradiation in 50-kGy steps with decomposition to PTFE micropowder, reactive perfluoroalkyl-(peroxy)radical centers are produced, which in the presence of air convert partially into relatively stable/long-lived peroxy radicals.

According to the prior art it is known that these PTFE (micro) powders can be tempered. The reactive perfluoroalkyl-(peroxy)radical centers are thus destroyed particularly at rising temperatures [K. Schierholz et al., J. Polym. Sci. Part B, Polymer Physics, Vol. 37, 2404-2411 (1999)].

With the method according to the invention, PTFE (micro) powders are used with the reactive perfluoroalkyl-(peroxy) radical centers formed.

The reactive perfluoroalkyl-(peroxy)radical centers are used in a targeted manner for the coupling with polymerizable, olefinically unsaturated monomers to grafted homopolymers, copolymers or terpolymers, in that in the modification reaction these PTFE (micro) powders with monomer (mixture)(s) in dispersion or in substance via a radical coupling are reacted to chemically coupled PTFE graft copolymer materials, i.e., PTFE polymer powders. These PTFE polymer powders are used as base material for successive operations (pressing the powders, compounding/mixing with other polymers and/or reactive coupling with other substances and/or polymers, if the graft branch has corresponding functional groups). These products exhibit improved mechanical and tribological properties through the grafting. These products have primarily interest, in which sliding friction processes are involved. A good bond and an improvement of the wear resistance is achieved through the chemical modification/compatibilization of the PTFE particle with the polymer matrix material, since the PTFE grain cannot be ground out of the matrix material with mechanical loading.

Since the surface-modified PTFE grain with the grafted polymer branches is in direct interaction with the matrix, compared to the physical mixtures, improved material properties are also observed, depending on the degree of bonding.

With the chemical surface modification of the PTFE micro powder and processing/incorporation in other polymers, new materials are obtained that exhibit improved wear resistances, i.e., increased durability in the applications, with comparable sliding friction coefficients. Furthermore, a reduction of the sliding friction coefficients and a noticeable improvement of the wear resistance is obtained through the addition of PFPE, whereby the reactively compatibilized PTFE additionally acts as a storage medium.

EXAMPLES

The invention is described below in more detail on the basis of several exemplary embodiments Comparative Example 1

Modification of Unirradiated PTFE Micropowders with styrene

In a liter flask 100 g thermally decomposed PTFE polymer (TF 9205 from Dyneon, unirradiated) is dispersed/stirred in 500 ml DMAc at room temperature, degassed and rinsed with nitrogen. The PTFE-DMAc dispersion is heated to 100° C. and 100 ml (freshly distilled) styrene is added and stirred for 2 hours at 100° C. The solid is separated and washed three times each with 500 ml DMAc and then three times each with 500 ml methylene chloride and dried.

The precipitation of the separated solution showed that (virtually) no uncombined styrene-homopolymer has formed, i.e. no styrene polymerization took place on the PTFE or in the solvent. The infrared spectroscopic evaluation of the separated and purified PTFE micropowders yielded pure/unmodified PTFE, i.e., no graft reaction took place between PTFE and styrene. No polystyrene absorptions were found in the infrared spectrum.

Example 1

Modification of PTFE emulsion polymer (Irradiated with 500 kGy) with styrene

Performance of the test and workup were carried out analogously to comparative example 1; however, 100 g PTFE emulsion polymer (TF 2025 from Dyneon) was used, which was irradiated with 500 kGy.

The infrared spectroscopic examination of the purified PTFE micropowder resulted in very high polystyrene absorptions in addition to the PTFE as proof of chemically coupled PTFE-polystyrene material. In comparative example 1 only pure PTFE was detectable in the infrared spectrum.

After the incorporation of 15% by weight modified PTFE micropowder in SBS in a laboratory kneader and production of test samples, the tribological examinations showed that the grafted PTFE-polystyrene material has a comparable sliding friction coefficient to the physical mixture, but that a considerably increased wear resistance is observed. The wear in the block/ring test with the compatibilized material shows a reduction to 60% compared to the material from comparative example 1.

Example 2

Modification of PTFE Suspension polymer (Irradiated with 500 kGy) with styrene

Performance of the test and workup were carried out analogously to comparative example 1; however, 100 g PTFE suspension polymer (TF 1750 from Dyneon) was used, which was irradiated with 500 kGy.

The infrared spectroscopic examination of the purified PTFE micropowder showed high polystyrene absorptions in addition to the PTFE as proof of chemically coupled PTFE-polystyrene material. In comparative example 1 only pure PTFE was detectable in the infrared spectrum.

After the incorporation of 15% by weight modified PTFE micropowder in SBS in a laboratory kneader and production of test samples, the tribological examinations showed that the grafted PTFE-polystyrene material has a comparable sliding friction coefficient to the physical mixture, but that a considerably increased wear resistance is observed. The wear in the block/ring test with the compatibilized material shows a reduction to 65% compared to the material from comparative example 1.

Comparative Example 2

Modification of Unirradiated PTFE Micropowders with a Mixture of styrene and acrylonitrile In a liter flask 100 g thermally decomposed PTFE polymer (TF 9205 from Dyneon, unirradiated) is dispersed/stirred in 500 ml DMAc at room temperature, degassed and rinsed with nitrogen. The PTFE-DMAc dispersion is heated to 100° C. and 50 ml styrene and 40 ml acrylonitrile (both freshly distilled) is added and stirred for 2 hours with reflux at 100° C. The solid is separated and washed three times each with 500 ml DMAc and then washed three times each with 500 ml methylene chloride and dried.

The precipitation of the separated solution showed that (virtually) no uncombined styrene-/SAN-homopolymer has formed, i.e. no styrene-/SAN polymerization took place on the PTFE or in the solvent. The infrared spectroscopic evaluation of the separated and purified PTFE micropowders yielded pure/unmodified PTFE, i.e., no graft reaction took place between PTFE and the monomers. No SAN absorptions were found in the infrared spectrum.

Example 3

Modification of PTFE emulsion polymer (Irradiated with 500 kGy) with styrene/acrylonitrile Performance of the test and workup were carried out analogously to comparative example 2; however, 100 g PTFE emulsion polymer (TF 2025 from Dyneon) was used, which was irradiated with 500 kGy. The precipitation of the separated solution showed that (virtually) no uncombined styrene-/SAN-homopolymer has formed.

The infrared spectroscopic evaluation of the purified PTFE micropowder yielded very high SAN absorptions in addition to the PTFE as proof of chemically coupled PTFE-SAN material. In comparative example 2, only pure PTFE was detectable in the infrared spectrum.

After the incorporation of 15% by weight modified PTFE micropowder in ABS in a laboratory kneader and production of test samples, the tribological examinations showed that the grafted PTFE-SAN material has a comparable sliding friction coefficient to the physical mixture, but that a considerably increased wear resistance is observed. The wear in the block/ring test with the chemically coupled material shows a reduction to 50% compared to the material from comparative example 2.

The further tribological examinations of the sample, to which during the incorporation in the ABS matrix 0.5% by weight PFPE (perfluoropolyether, DuPont) was added, showed that these test samples exhibit a sliding friction coefficient values approx. 45% lower compared to the only chemically coupled material and that an increase of the wear resistance is observed. The wear in the block/ring test with the chemically coupled material and with PFPE modified materials showed a reduction to 20% compared to the material without added PFPE.

Example 4

Modification of PTFE Suspension polymer (Irradiated with 500 kGy) with styrene/acrylonitrile Performance of the test and workup were carried out analogously to comparative example 2; however, 100 g PTFE suspension polymer (TF 1750 from Dyneon) was used, which was irradiated with 500 kGy. The precipitation of the separated solution showed that (virtually) no uncombined styrene-/SAN-homopolymer has formed.

The infrared spectroscopic evaluation of the purified PTFE micropowder yielded high SAN absorptions in addition to the PTFE as proof of chemically coupled PTFE-SAN material. In comparative example 2, only pure PTFE was detectable in the infrared spectrum.

After the incorporation of 15% by weight modified PTFE micropowder in ABS in a laboratory kneader and production of test samples, the tribological examinations showed that the grafted PTFE-SAN material has a comparable sliding friction coefficient to the physical mixture, but that a considerably increased wear resistance is observed. The wear in the block/ring test with the chemically coupled material shows a reduction to 63% compared to the material from comparative example 2.

The further tribological examinations of the sample, to which during the incorporation in the ABS matrix 0.5% by weight PFPE (perfluoropolyether, DuPont) was added, showed that these test samples exhibit a sliding friction coefficient values approx. 45% lower compared to the only chemically coupled material and that an increase of the wear resistance is observed. The wear in the block/ring test with the chemically coupled material and with PFPE modified materials showed a reduction to 18% compared to the material without added PFPE.

Comparative Example 3

Modification of Unirradiated PTFE Micropowders with a Mixture of styrene and maleic anhydride In a liter flask 100 g thermally decomposed PTFE polymer (TF 9205 from Dyneon, unirradiated) is dispersed/stirred in 500 ml DMAc at room temperature, degassed and rinsed with nitrogen. The PTFE-DMAc dispersion is heated to 100° C. and 50 ml styrene (freshly distilled) and 50 g maleic anhydride is added and stirred for 2 hours at 100° C. The solid is separated and washed three times each with 500 ml DMAc and then three times each with 500 ml methylene chloride and dried.

The precipitation of the separated solution showed that (virtually) no uncombined styrene-maleic anhydride copolymer (SMAn) has formed, i.e. no SMAn polymerization took place on the PTFE or in the solvent. The infrared spectroscopic evaluation of the separated and purified PTFE micropowders yielded pure/unmodified PTFE, i.e., no graft reaction took place between PTFE and SMAn. No SMAn absorptions are found in the infrared spectrum.

Example 5

Modification of PTFE emulsion polymer (Irradiated with 500 kGy) with styrene/maleic anhydride Performance of the test and workup were carried out analogously to comparative example 3; however, 100 g PTFE emulsion polymer (TF 2025 from Dyneon) was used, which was irradiated with 500 kGy. The precipitation of the separated solution showed that (virtually) no uncombined SMAn-homopolymer has formed. The infrared spectroscopic evaluation of the purified PTFE micropowder yielded very high SMAn absorptions in addition to the PTFE as proof of chemically coupled PTFE-SMAn material. In comparative example 3, only pure PTFE was detectable in the infrared spectrum.

After the incorporation of 15% by weight modified PTFE micropowder in PA-6 in a laboratory kneader and production of test samples, the tribological examinations showed that the grafted PTFE-SMAn material in PA-6 has a comparable sliding friction coefficient to the physical mixture, but that a considerably increased wear resistance is observed. The wear in the block/ring test with the chemically coupled material shows a reduction to 55% compared to the material from comparative example 3.

The separation of the uncombined PA-6 matrix from the PTFE solid by means of solution in formic acid and centrifuging showed in the infrared spectrum that in addition high PA absorptions were observed. The PA-6 could not be separated from the solid after 5-fold separation operation, i.e., through the reaction during the compounding of the PTFE polymer powder [PTFE-SMAn] with PA-6 a chemical coupling and compatibilization occurred.

The further tribological examinations of this sample, to which during the incorporation in the PA-6 matrix 0.5% by weight PFPE (perfluoropolyether, DuPont) was added, showed that these test samples exhibit a sliding friction coefficient values approx. 50% lower compared to the only chemically coupled material and that an increase of the wear resistance is observed. The wear in the block/ring test with the chemically coupled material and the material modified with PFPE shows a reduction to 70% compared to the chemically coupled material.

Example 6

Modification of PTFE Suspension polymer (Irradiated with 500 kGy) with styrene/maleic anhydride Performance of the test and workup were carried out analogously to comparative example 3; however, 100 g PTFE suspension polymer (TF 1750 from Dyneon) was used, which was irradiated with 500 kGy. The precipitation of the separated solution showed that (virtually) no uncombined styrene-/SMAn-homopolymer has formed.

The infrared spectroscopic evaluation of the purified PTFE micropowder yielded high SMAn absorptions in addition to the PTFE as proof of chemically coupled PTFE-SMAn material. In comparative example 3, only pure PTFE was detectable in the infrared spectrum.

After the incorporation of 15% by weight modified PTFE micropowder in PA-6 in a laboratory kneader and production of test samples, the tribological examinations showed that the grafted PTFE-SMAn material in PA-6 has a comparable sliding friction coefficient to the physical mixture, but that a considerably increased wear resistance is observed. The wear in the block/ring test with the chemically coupled material shows a reduction to 58% compared to the material from comparative example 3.

The separation of the uncombined PA-6 matrix from the PTFE solid by means of solution in formic acid and centrifuging showed in the infrared spectrum that in addition high PA absorptions were observed. The PA-6 could not be separated from the solid after 5-fold separation operation, i.e., through the reaction during the compounding of the PTFE polymer powder [PTFE-SMAn] with PA-6 a chemical coupling and compatibilization occurred.

The further tribological examinations of this sample, to which during the incorporation in the PA-6 matrix 0.5% by weight PFPE (perfluoropolyether, DuPont) was added, showed that these test samples exhibit a sliding friction coefficient values approx. 50% lower compared to the only chemically coupled material and that an increase of the wear resistance is observed. The wear in the block/ring test with the chemically coupled material and the material modified with PFPE shows a reduction in wear to 63% compared to the chemically coupled material.

Comparative Example 4

Modification of Unirradiated PTFE Micropowders with glycidyl methacrylate (GMA)

In a liter flask 100 g thermally decomposed PTFE polymer (TF 9205 from Dyneon, unirradiated) is dispersed/stirred in 500 ml DMAc at room temperature, degassed and rinsed with nitrogen. The PTFE-DMAc dispersion is heated to 100° C. and 60 ml GMA (freshly distilled) is added and stirred for 2 hours at 100° C. The solid is separated and washed three times each with 500 ml DMAc and then three times each with 500 ml methanol and dried.

The precipitation of the separated solution showed that some uncombined GMA homopolymer has formed, i.e. no GMA polymerization took place on the PTFE or in the solvent. The infrared spectroscopic evaluation of the separated and purified PTFE micropowders yielded pure/unmodified PTFE, i.e., no graft reaction took place between PTFE and GMA. No poly-GMA absorptions are found in the infrared spectrum.

Example 7

Modification of PTFE emulsion polymer (Irradiated with 500 kGy) with glycidyl methacrylate (GMA)

Performance of the test and workup were carried out analogously to comparative example 4; however, 100 g PTFE emulsion polymer (TF 2025 from Dyneon) was used, which was irradiated with 500 kGy.

The infrared spectroscopic evaluation of the purified PTFE micropowder showed very high poly-GMA absorptions in addition to the PTFE as proof of chemically coupled PTFE-poly-GMA material. In comparative example 4, only pure PTFE was detectable in the infrared spectrum.

After the incorporation of 15% by weight of the modified PTFE micropowder in an epoxide resin and after cross-linking in the form of a plate and production of test samples, the tribological examinations showed that the grafted PTFE-poly-GMA material has a comparable sliding friction coefficient to the physical mixtures, but that an increased wear resistance is observed. The wear in the block/ring test with the chemically coupled material showed a reduction to 65% compared to the material from comparative example 4.

The further tribological examinations of this sample, to which during the incorporation in the epoxide resin matrix 0.5% by weight PFPE (perfluoropolyether, DuPont) was added, showed that these test samples exhibit a sliding friction coefficient values approx. 35% lower compared to the only chemically coupled material and that an increase of the wear resistance. is observed. The wear in the block/ring test with the chemically coupled material and the PFPE modified material showed a reduction in wear to 55% compared to the chemically coupled material.

After the incorporation of 15% by weight of the modified PTFE micropowder in a polyurea resin mixture and after cross-linking in the form of a plate and production of test samples, the tribological examinations showed that the grafted PTFE-poly-GMA material in polyurea has comparable sliding friction coefficients to the physical mixture, but that an increased wear resistance is observed. The wear in the block/ring test with the chemically coupled material shows a reduction to 42% compared to the material from comparative example 4.

The further tribological examinations of this sample, to which during the incorporation in the polyurea resin matrix 0.5% by weight PFPE (perfluoropolyether, DuPont) was added, showed that these test samples exhibit a sliding friction coefficient values approx. 45% lower compared to the only chemically coupled material and that an increase of the wear resistance is observed. The wear in the block/ring test with the chemically coupled material and the material modified with PFPE showed a reduction to 35% compared to the chemically coupled material.

Example 8

Modification of PTFE Suspension polymer (Irradiated with 500 kGy) with glycidyl methacrylate (GMA)

Performance of the test and workup were carried out analogously to comparative example 4; however, 100 g PTFE suspension polymer (TF 1750 from Dyneon) was used, which was irradiated with 500 kGy.

The infrared spectroscopic evaluation of the purified PTFE micropowder showed high poly-GMA absorptions in addition to the PTFE as proof of chemically coupled PTFE-poly-GMA material. In comparative example 4, only pure PTFE was detectable in the infrared spectrum.

After the incorporation of 15% by weight of the modified PTFE micropowder in an epoxide resin and after cross-linking in the form of a plate and production of test samples, the tribological examinations showed that the grafted PTFE-poly-GMA material has a comparable sliding friction coefficient to the physical mixtures, but that an increased wear resistance is observed. The wear in the block/ring test with the chemically coupled material shows a reduction to 68% compared to the material from comparative example 4.

The further tribological examinations of this sample, to which during the incorporation in the epoxide resin matrix 0.5% by weight PFPE (perfluoropolyether, DuPont) was added, showed that these test samples exhibit a sliding friction coefficient values approx. 35% lower compared to the only chemically coupled material and that an increase of the wear resistance is observed. The wear in the block/ring test with the chemically coupled material and with the material modified with PFPE showed a reduction in wear to 58% compared to the chemically coupled material.

After the incorporation of 15% by weight of the modified PTFE micropowder in a polyurea resin mixture and after cross-linking in the form of a plate and production of test samples, the tribological examinations showed that the grafted PTFE-poly-GMA material in polyurea has comparable sliding friction coefficients to the physical mixture, but that an increased wear resistance is observed. The wear in the block/ring test with the chemically coupled material shows a reduction to 45% compared to the material from comparative example 4.

The further tribological examinations of this sample, to which during the incorporation in the polyurea resin matrix 0.5% by weight PFPE (perfluoropolyether, DuPont) was added, showed that these test samples exhibit a sliding friction coefficient values approx. 45% lower compared to the only chemically coupled material and that an increase of the wear resistance is observed. The wear in the block/ring test with the chemically coupled material and the material modified with PFPE showed a reduction to 38% compared to the chemically coupled material.

Comparative Example 5

Modification of Unirradiated PTFE Micropowders with a acrylic acid (AAc)

In a liter flask 100 g thermally decomposed PTFE polymer (TF 9205 from Dyneon, unirradiated) is dispersed/stirred in 500 ml DMAc at room temperature, degassed and rinsed with nitrogen. The PTFE-DMAc dispersion is heated to 100° C. and 50 ml AAc (freshly distilled) is added and stirred for 2 hours at 100° C. The solid is separated and washed three times each with 500 ml methanol/water (1:1) and then three times each with 500 ml methanol and dried. The infrared spectroscopic evaluation of the separated and purified PTFE micropowders yielded pure/unmodified PTFE, i.e., no graft reaction took place between PTFE and acrylic acid. No polyacrylic acid absorptions were found in the infrared spectrum.

Example 9

Modification of PTFE emulsion polymer (Irradiated with 500 kGy) with acrylic acid (AAc)

Performance of the test and workup were carried out analogously to comparative example 5; however, 100 g PTFE emulsion polymer (TF 2025 from Dyneon) was used, which was irradiated with 500 kGy.

The infrared spectroscopic evaluation of the purified PTFE micropowder showed very high polyacrylic acid absorptions in addition to the PTFE as proof of chemically coupled PTFE-polyacrylic acid material. In comparative example 5, only pure PTFE was detectable in the infrared spectrum.

After the incorporation of 15% by weight of the modified PTFE micropowder in PA-6 in a laboratory kneader and the production of test samples, the tribological examinations showed that the grafted PTFE-poly-AAc material in PA-6 has a comparable sliding friction coefficient to the physical mixtures, but that an increased wear resistance is observed. The wear in the block/ring test with the chemically coupled material shows a reduction to 65% compared to the material from comparative example 5.

The separation of the uncombined PA-6 matrix from the PTFE solid by means of solution in formic acid and separation of the PTFE powder showed in the infrared spectrum that high PA absorption bands were observed. The PA could not be separated from the solid after 5-fold separation operation, i.e., through the reaction during the compounding of the PTFE polymer powder [PTFE-poly-AAc] with PA-6, a chemical coupling and compatibilization took place.

The further tribological examinations of this sample, to which during the incorporation in the PA-6 matrix 0.5% by weight PFPE (perfluoropolyether, DuPont) was added, showed that these test samples exhibit a sliding friction coefficient values approx. 55% lower compared to the only chemically coupled material and that an increase of the wear resistance is observed. The wear in the block/ring test with the chemically coupled material and the material modified with PFPE showed a reduction in wear to 65% compared to the chemically coupled material.

Example 10

Modification of PTFE Suspension polymer (Irradiated with 500 kGy) with acrylic acid (AAc)

Performance of the test and workup were carried out analogously to comparative example 5; however, 100 g PTFE suspension polymer (TF 1750 from Dyneon) was used, which was irradiated with 500 kGy.

The infrared spectroscopic evaluation of the purified PTFE micropowder showed high polyacrylic acid absorptions in addition to the PTFE as proof of chemically coupled PTFE-polyacrylic acid material. In comparative example 5, only pure PTFE was detectable in the infrared spectrum.

After the incorporation of 15% by weight modified PTFE micropowder in PA-6 in a laboratory kneader and the production of test samples, the tribological examinations showed that the grafted PTFE-poly-AAc material in PA-6 has a comparable sliding friction coefficient to the physical mixtures, but that an increased wear resistance is observed. The wear in the block/ring test with the chemically coupled material showed a reduction to 72% compared to the material from comparative example 5.

The separation of the uncombined PA-6 matrix from the PTFE solid by means of solution in formic acid and separation of the PTFE powder showed in the infrared spectrum that high PA absorption bands were observed. The PA-6 could not be separated from the solid after 5-fold separation operation, i.e., through the reaction during the compounding of the PTFE polymer powder [PTFE-poly-AAc] with PA-6, a chemical coupling and compatibilization took place.

The further tribological examinations of this sample, to which during the incorporation in the PA-6 matrix 0.5% by weight PFPE (perfluoropolyether, DuPont) was added, showed that these test samples exhibit a sliding friction coefficient values approx. 55% lower compared to the only chemically coupled material and that an increase of the wear resistance is observed. The wear in the block/ring test with the chemically coupled material and the material modified with PFPE showed a reduction in wear to 61% compared to the chemically coupled material.

Comparative Example 6

Modification of Unirradiated PTFE Micropowders with Vinyl acetate (VAc)

In a liter flask 100 g thermally decomposed PTFE polymer (TF 9205 from Dyneon, unirradiated) is dispersed/stirred in 500 ml DMAc at room temperature, degassed and rinsed with nitrogen. The PTFE-DMAc dispersion is heated to 100° C. and 100 ml VAc (freshly distilled) is added and stirred for 2 hours at 100° C. The solid is separated and washed three times each with 500 ml DMAc and then three times each with 500 ml methylene chloride and dried. The infrared spectroscopic evaluation of the separated and purified PTFE micropowders yielded pure/unmodified PTFE, i.e., no graft reaction took place between PTFE and VAc. No polyvinyl acetate absorptions were found in the infrared spectrum.

Example 11

Modification of PTFE emulsion polymer (Irradiated with 500 kGy) with Vinyl acetate (VAc)

Performance of the test and workup were carried out analogously to comparative example 6; however, 100 g PTFE emulsion polymer (TF 2025 from Dyneon) was used, which was irradiated with 500 kGy.

The infrared spectroscopic evaluation of the purified PTFE micropowder showed very high polyvinyl acetate absorptions in addition to the PTFE as proof of chemically coupled PTFE-polyvinyl acetate material. In comparative example 6, only pure PTFE was detectable in the infrared spectrum.

The VAc-grafted PTFE micropowder is modified to PTFE-polyvinyl alcohol (PTFE-poly-VAl) in a concentrated potassium hydroxide solution (methanol/water, 1:1) and used in this form.

After the incorporation of 15% by weight modified PTFE micropowder in TPU (thermoplastic polyurethane) in a laboratory kneader and the production of test samples, the tribological examinations showed that the grafted and modified PTFE-poly-VAl material in TPU has a comparable sliding friction coefficient to the physical mixture, but that a considerably increased wear resistance is observed. The wear in the block/ring test with the chemically coupled material shows a reduction in the wear to 35% compared to the material from comparative example 6.

After the incorporation of 15% by weight PTFE micropowder in a polyurea resin mixture and after the cross-linking in the form of a plate and the production of test samples, the tribological examinations showed that the chemically grafted PTFE-poly-VAl material in polyurea has a comparable sliding friction coefficient to the physical mixture, but that an increased wear resistance is observed. The wear in the block/ring test with the chemically coupled material showed a reduction in the wear to 42% compared to the material from comparative example 6.

Example 12

Modification of PTFE Suspension polymer (Irradiated with 500 kGy) with Vinyl acetate (VAc)

Performance of the test and workup were carried out analogously to comparative example 6; however, 100 g PTFE suspension polymer (TF 1750 from Dyneon) was used, which was irradiated with 500 kGy.

The infrared spectroscopic evaluation of the purified PTFE micropowder showed high polyvinyl acetate absorptions in addition to the PTFE as proof of chemically coupled PTFE-polyvinyl acetate material. In comparative example 6, only pure PTFE was detectable in the infrared spectrum.

The VAc-grafted PTFE micropowder is modified to PTFE-polyvinyl alcohol (PTFE-poly-VAl) in a concentrated potassium hydroxide solution (methanol/water, 1:1) and used in this form.

After the incorporation of 15% by weight PTFE micropowder in TPU (thermoplastic polyurethane) in a laboratory kneader and the production of test samples, the tribological examinations showed that the grafted and modified PTFE-poly-VAl material in TPU has a comparable sliding friction coefficient to the physical mixture, but that a considerably increased wear resistance is observed. The wear in the block/ring test with the chemically coupled material shows a reduction in the wear to 40% compared to the material from comparative example 6.

After the incorporation of 15% by weight PTFE micropowder in a polyurea resin mixture and after the cross-linking in the form of a plate and the production of test samples, the tribological examinations showed that the chemically grafted PTFE-poly-VAl material in polyurea has a comparable sliding friction coefficient to the physical mixture, but that an increased wear resistance is observed. The wear in the block/ring test with the chemically coupled material showed a reduction in the wear to 47% compared to the material from comparative example 6.

Example 13

Modification of Plasma-Modified PTFE Micropowders with acrylic acid (AAc)

Performance of the test and workup were carried out analogously to comparative example 5; however, 100 g plasma-treated PTFE (TF 9025, thermally decomposed, Dyneon, modified with oxygen plasma) was used.

The infrared spectroscopic evaluation of the purified PTFE micropowder showed polyacrylic acid absorptions in addition to the PTFE as proof of chemically coupled PTFE-polyacrylic acid material. In comparative example 5, only pure PTFE was detectable in the infrared spectrum.

After the incorporation of 15% by weight modified PTFE micropowder in PA-6 in a laboratory kneader and the production of test samples, the tribological examinations showed that the grafted PTFE-poly-AAc material in PA-6 has a comparable sliding friction coefficient to the physical mixtures, but that an increased wear resistance is observed. The wear in the block/ring test with the chemically coupled material showed a reduction to 82% compared to the material from comparative example 5.

The separation of the uncombined PA-6 matrix from the PTFE solid by means of solution in formic acid and separation of the PTFE powder showed in the infrared spectrum that high PA absorption bands were observed. The PA-6 could not be separated from the solid after 5-fold separation operation, i.e., through the reaction during the compounding of the PTFE polymer powder [PTFE-poly-AAc] with PA-6, a chemical coupling and compatibilization took place.

The invention claimed is:

1. Method for producing a radically coupled polytetrafluoroethylene polymer powder comprising at least one of radiation-chemically or plasma-chemically modified polytetrafluoroethylene powder including a surface, and homopolymers, copolymers or terpolymers radically coupled on the surface via a reaction in dispersion or in solid, comprising reacting polytetrafluoroethylene powder that is at least one of radiation-chemically or plasma-chemically modified and has reactive perfluoroalkyl-(peroxy) radical centers, in dispersion or solid with polymerizable olefinically unsaturated monomers to form homopolymers, copolymers or terpolymers radically coupled to the surface of the at least one of radiation-chemically or plasma-chemically modified polytetrafluoroethylene powder.

2. The method according to claim 1, wherein the polytetrafluoroethylene powder with reactive perfluoroalkyl-(peroxy) radical centers after at least one of radiation-chemical or plasma-chemical modification is subjected to a tempering at low temperatures.

3. The method according to claim 1, wherein the polytetrafluoroethylene powder comprises radiation-chemically modified polytetrafluoroethylene powder.

4. The method according to claim 1, wherein the polytetrafluoroethylene powder is radiation-chemically modified with a radiation dose greater than 50 kGy.

5. The method according to claim 1, wherein the polytetrafluoroethylene powder is radiation-chemically modified with a radiation dose greater than 100 kGy.

6. The method according to claim 1, wherein the polytetrafluoroethylene powder is radiation-chemically modified in presence of reactants to form the at least one of radiation-chemically or plasma-chemically modified polytetrafluoroethylene powder including a surface.

7. The method according to claim 1, wherein the polytetrafluoroethylene powder is radiation-chemically modified under influence of oxygen.

8. The method according to claim 1, wherein the polytetrafluoroethylene powder is a micropowder.

9. The method according to claim 1, wherein the reaction is performed in an autoclave or in a stirred tank or in an extruder/kneader.

10. The method according to claim 1 wherein the olefinically unsaturated monomers comprise at least one of styrene, acrylonitrile, maleic anhydride, acrylic acid, (meth-)methyl acrylate, vinyl acetate, glycidyl methacrylate or (meth-)acrylamide compounds.

11. The method according to claim 1 wherein the olefinically unsaturated monomers comprise a mixture of monomers.

12. The method according to claim 1, wherein the olefinically unsaturated monomers comprise at least one of macromeres or oligomers.

13. The method according to claim 12, further comprising incorporating the polytetrafluoroethylene polymer powder in plastics/polymers.

14. The method according to claim 1, wherein the polytetrafluoroethylene polymer powder includes functional groups which in subsequent reactions are reacted with other low-molecular, oligomeric and/or polymeric substances.

15. The method according to claim 14, wherein the polytetrafluoroethylene polymer powder is incorporated into at least one of elastomers, thermoplastics or thermosets.

* * * * *